(12) United States Patent
Suh

(10) Patent No.: US 7,342,606 B2
(45) Date of Patent: Mar. 11, 2008

(54) ZOOM LENS SYSTEM FOR CAMERA

(75) Inventor: Jae-Gyeong Suh, Changwon (KR)

(73) Assignee: Samsung Techwin Co., Ltd. (KR)

( * ) Notice: Subject to any disclaimer, the term of this patent is extended or adjusted under 35 U.S.C. 154(b) by 620 days.

(21) Appl. No.: 10/423,776

(22) Filed: Apr. 25, 2003

(65) Prior Publication Data
US 2003/0219244 A1 Nov. 27, 2003

(30) Foreign Application Priority Data
May 24, 2002 (KR) ...................... 10-2002-0029031

(51) Int. Cl.
H04N 5/262 (2006.01)
H04N 5/232 (2006.01)
G03B 13/00 (2006.01)
G03B 15/14 (2006.01)
G03B 17/00 (2006.01)
G03B 3/10 (2006.01)
G03B 13/34 (2006.01)

(52) U.S. Cl. .................... 348/240.3; 348/345; 348/357; 359/696; 359/699; 396/79; 396/85; 396/133

(58) Field of Classification Search ........... 348/240.99, 348/240.1, 240.3; 359/694, 696, 699–701, 359/826; 396/111, 144, 349, 72, 76–79, 396/85–88
See application file for complete search history.

(56) References Cited
U.S. PATENT DOCUMENTS 5,847,531 A * 12/1998 Hoffsommer et al. ....... 318/696
5,982,566 A 11/1999 Nishimura et al. ......... 359/822
6,069,745 A * 5/2000 Fujii et al. .................. 359/694
6,639,730 B2 * 10/2003 Muto et al. ................. 359/694
RE38,308 E * 11/2003 Ito .............................. 359/700
2002/0036836 A1 * 3/2002 Hagimori .................... 359/694

* cited by examiner

Primary Examiner—Lin Ye
Assistant Examiner—Dan Pasiewicz
(74) Attorney, Agent, or Firm—Tuchman & Park LLC

(57) ABSTRACT

A zoom lens system includes a zoom base to which an image pickup device can be coupled, a driving source for generating rotational force in accordance with a control signal of a control unit disposed in the electronic facility, plural power transmission gears disposed on the zoom base to reduce the rotational force of the driving source, a first lens cam disposed on the zoom base and rotated by the rotational force of the power transmission gears, plural first lens shafts coupled on the zoom base in a direction of an optical axis and located in the first lens cam, a first lens barrel having a first lens, the first lens barrel being disposed in the first lens cam and slidably coupled to the first lens shaft in the direction of the optical axis so as to move in the direction of the optical axis in accordance with rotation of the first lens cam, a power transmission member coupled to the first lens cam in the direction of the optical axis, an outer second lens cam disposed on an outer circumference of the first lens cam and fixed on the zoom base, an inner second lens cam disposed in the outer lens cam and rotating and moving linearly by the power transmission member, plural second lens shafts coupled to the zoom base in the direction of the optical axis and located in the inner second lens cam, and a second lens barrel having a second lens and being disposed in the inner second lens cam and slidably coupled to the second lens shaft to linearly move in the direction of the optical axis in accordance with rotation of the inner second lens cam.

13 Claims, 16 Drawing Sheets

ZOOM LENS SYSTEM FOR CAMERA

CROSS-REFERENCES TO RELATED APPLICATIONS

This application claims priority from Korean Patent Application No. 2002-0029031 filed on May 24, 2002 in the Korean Intellectual Property Office, the disclosures of which are incorporated herein in their entirety by reference.

BACKGROUND OF THE INVENTION

1. Field of the Invention

The present invention relates to a zoom lens system, and more particularly, to a micro zoom lens system with an optical zooming function, which can be employed in a portable communication system.

2. Description of the Related Art

Generally, a single focusing lens has been used as a micro lens system employed in a portable communication system. That is, to form a lens in a size satisfying the micro grade, such a single focusing lens formed in a simple structure has been widely used. However, since the single focusing lens system cannot provide a zooming function, an electronic zooming function that is processed by software is applied to the single focusing lens system. However, such an electronic zooming function has a limitation in satisfying users who want more definite image.

SUMMARY OF THE INVENTION

Therefore, the present invention has been made in an effort to solve the above-described problems.

It is an objective of the present invention to provide a zoom lens system that is formed in a micro grade so that it can be employed in a portable communication device or other portable electronic facilities while realizing an optical zooming function.

To achieve the above object, the present invention provides a zoom lens system comprising a zoom base to which an image pickup device can be coupled, the zoom base being designed to be coupled to an electronic facility; a driving source for generating rotational force in accordance with a control signal of a control unit disposed in the electronic facility; plural power transmission gears disposed on the zoom base to reduce the rotational force of the driving source; a first lens cam disposed on the zoom base and rotated by the rotational force of the power transmission gears; plural first lens shafts coupled on the zoom base in a direction of an optical axis and located in the first lens cam; a first lens barrel having a first lens, the first lens barrel being disposed in the first lens cam and slidably coupled to the first lens shaft in the direction of the optical axis to move in the direction of the optical axis in accordance with rotation of the first lens cam; a power transmission member coupled to the first lens cam in the direction of the optical axis; an outer second lens cam disposed on an outer circumference of the first lens cam and fixed on the zoom base; an inner second lens cam disposed in the outer lens cam and rotating and moving linearly by the power transmission member; plural second lens shafts coupled to the zoom base in the direction of the optical axis and located in the inner second lens cam; and a second lens barrel having a second lens, the second lens barrel being disposed in the inner second lens cam and slidably coupled to the second lens shaft to linearly move in the direction of the optical axis in accordance with rotation of the inner second lens cam.

Preferably, the driving source comprises a rotor formed of a step motor magnet; and a stator having a pair of step motor coils and a pair of step motor yokes, the step motor coils being disposed on an outer circumference of the step motor magnet and spaced away from each other at right angles, and the step motor yokes being disposed on an outer circumference of the step motor magnet and spaced away from each other at right angles.

Preferably, the first lens cam is provided at its inner circumference with plural cam grooves, and the first lens barrel is provided at its outer circumference with plural cam projections slidably coupled to the cam grooves.

Preferably, the outer second lens cam is provided at its inner circumference with plural cam grooves, and the inner second lens cam is provided at its outer circumference with plural cam projections slidably coupled to the cam grooves.

Preferably, the inner second lens cam is provided at its inner circumference with plural cam grooves, and the second lens barrel is provided at its outer circumference with plural cam projections slidably coupled to the cam grooves.

According to another aspect of the present invention, a zoom lens system comprises:

a zoom base to which an image pickup device can be coupled, the zoom base being designed to be coupled to an electronic facility; a driving source for generating rotational force in accordance with a control signal of a control unit disposed in the electronic facility; plural power transmission gears disposed on the zoom base to reduce the rotational force of the driving source; a first lens assembly disposed on the zoom base and moved in a direction of an optical axis by the power transmission gears, the first lens assembly having a first lens barrel with a first lens; and a second lens assembly disposed on an outer circumference of the first lens assembly and coupled to the zoom base, the second lens assembly cooperating with the first lens assembly and having a second barrel with a second lens, wherein when an optical zoom is controlled from a close state to a wide state, the second barrel is moved toward a subject with respect to the first lens barrel, and when controlled from the wide state to the close state, the first lens barrel is moved toward the subject and the second lens barrel is moved toward the first lens barrel.

Preferably, the first lens assembly comprises a first lens cam rotatably disposed on the zoom base and rotated by rotational force of the power transmission gears; plural first lens shafts coupled to the zoom base in a direction of an optical axis and located in the first lens cam; and a first lens barrel disposed in the first lens cam and coupled to the first lens shafts to be slidable in the direction of the optical axis to linearly move in the direction of the optical axis in accordance with rotation of the first lens cam.

Preferably, the second lens assembly comprises an outer second lens cam disposed on an outer circumference of the first lens cam and fixed on the zoom base; an inner second lens cam disposed to be rotatable and linearly movable in the outer second lens cam; plural second lens shafts coupled on the zoom base in the direction of the optical axis and located in the inner second lens cam; and a second lens barrel disposed in the inner second lens cam and coupled to the second lens shafts to linearly move in the direction of the optical axis in accordance with rotation of the inner second lens cam.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE DRAWINGS

A preferred embodiment of the present invention will be described in more detail in conjunction with the accompanying drawings.

Figure 1:
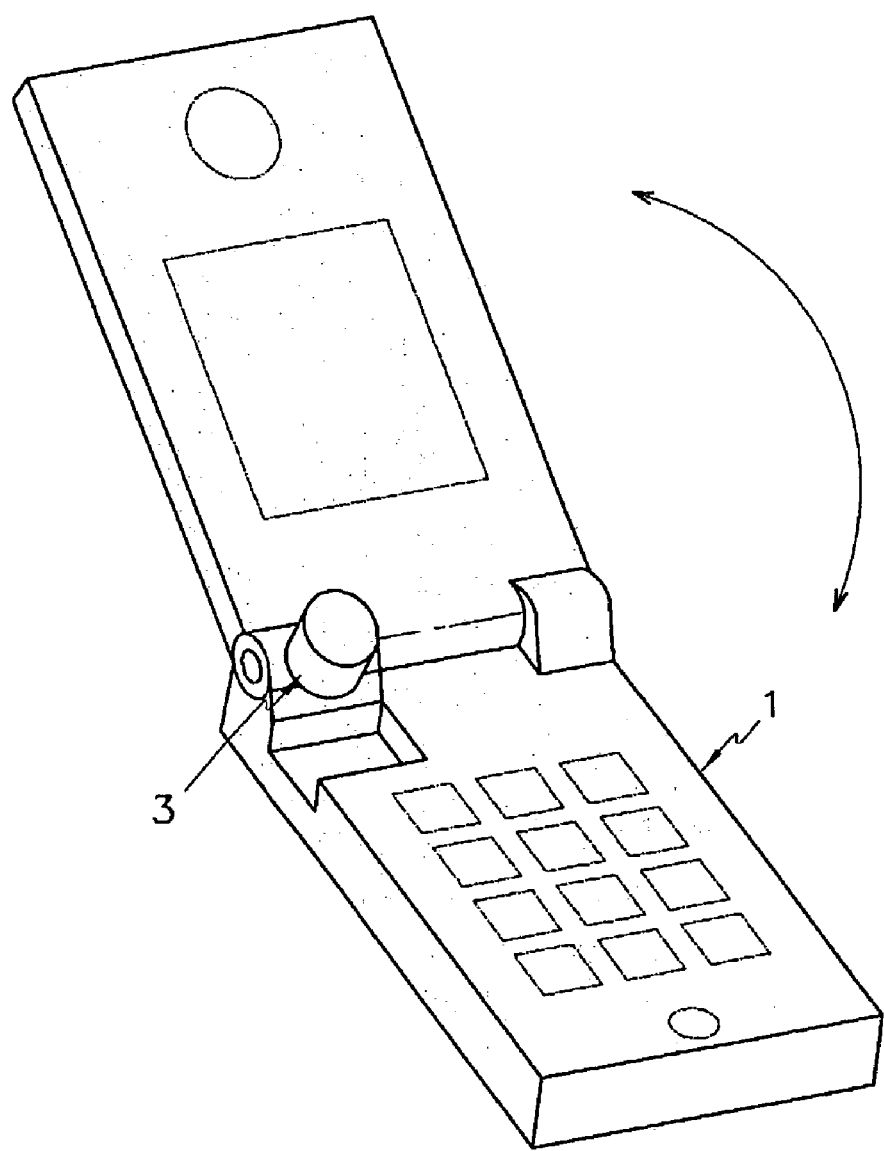
FIG. 1 is a perspective view illustrating an application example of a zoom lens system of the present invention.

FIG. 1 shows an example of an application of a zoom lens system of the present invention, in which the zoom lens system 3 is employed to a portable electronic facility such as a mobile phone 1.

The zoom lens system 3 is formed in a micro grade and is designed to realize the zooming function. That is, the zoom lens system 3 is designed to be received in the portable electronic facility having an image input device such as a mobile phone 1, a notebook computer, a PC camera, a PDA, or a door phone.

Figure 2:
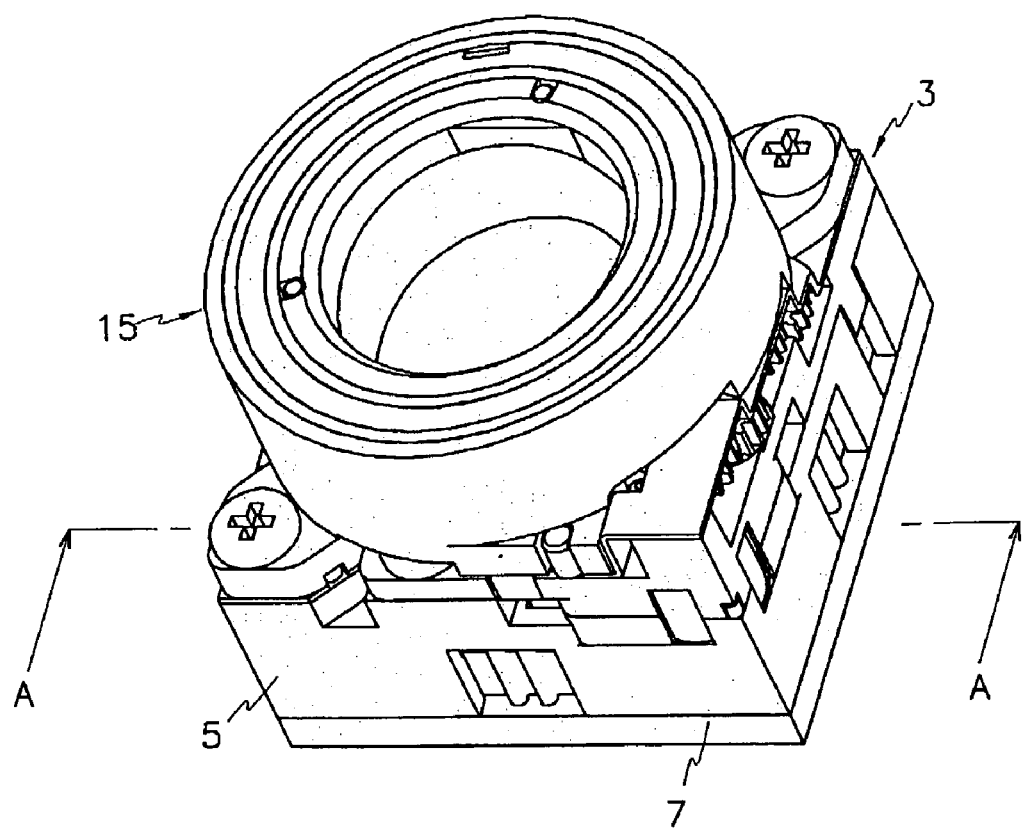
FIG. 2 is a perspective view of a zoom lens system according to a preferred embodiment of the present invention.
Figure 3:
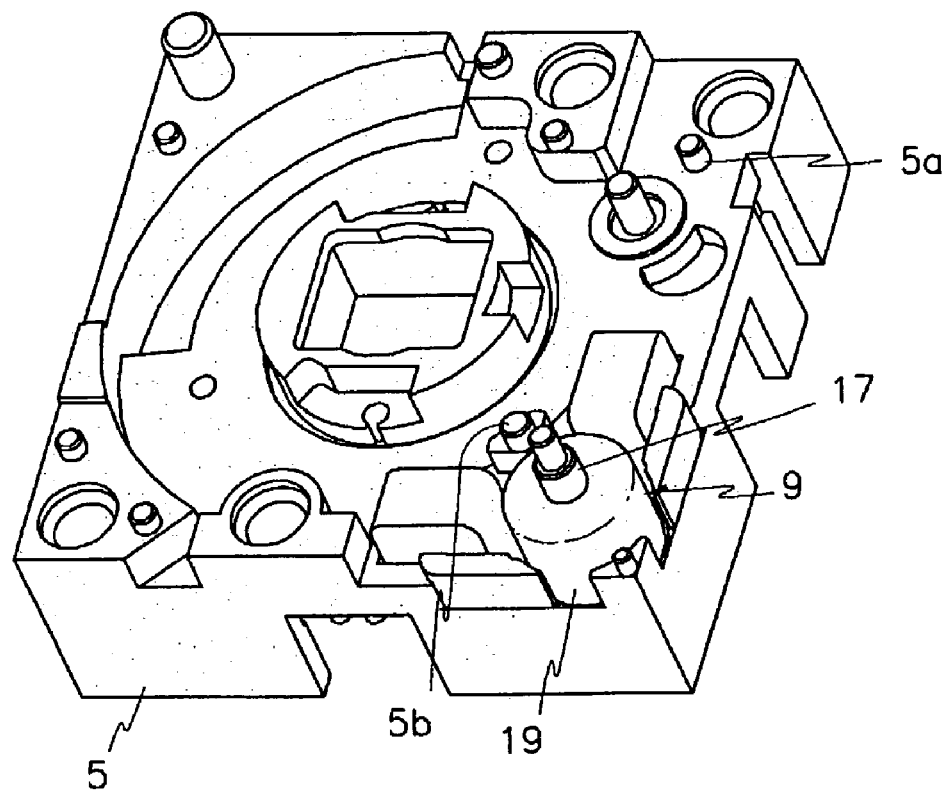
FIG. 3 is a schematic view illustrating a driving source and a zoom base according to a preferred embodiment of the present invention.
Figure 4:
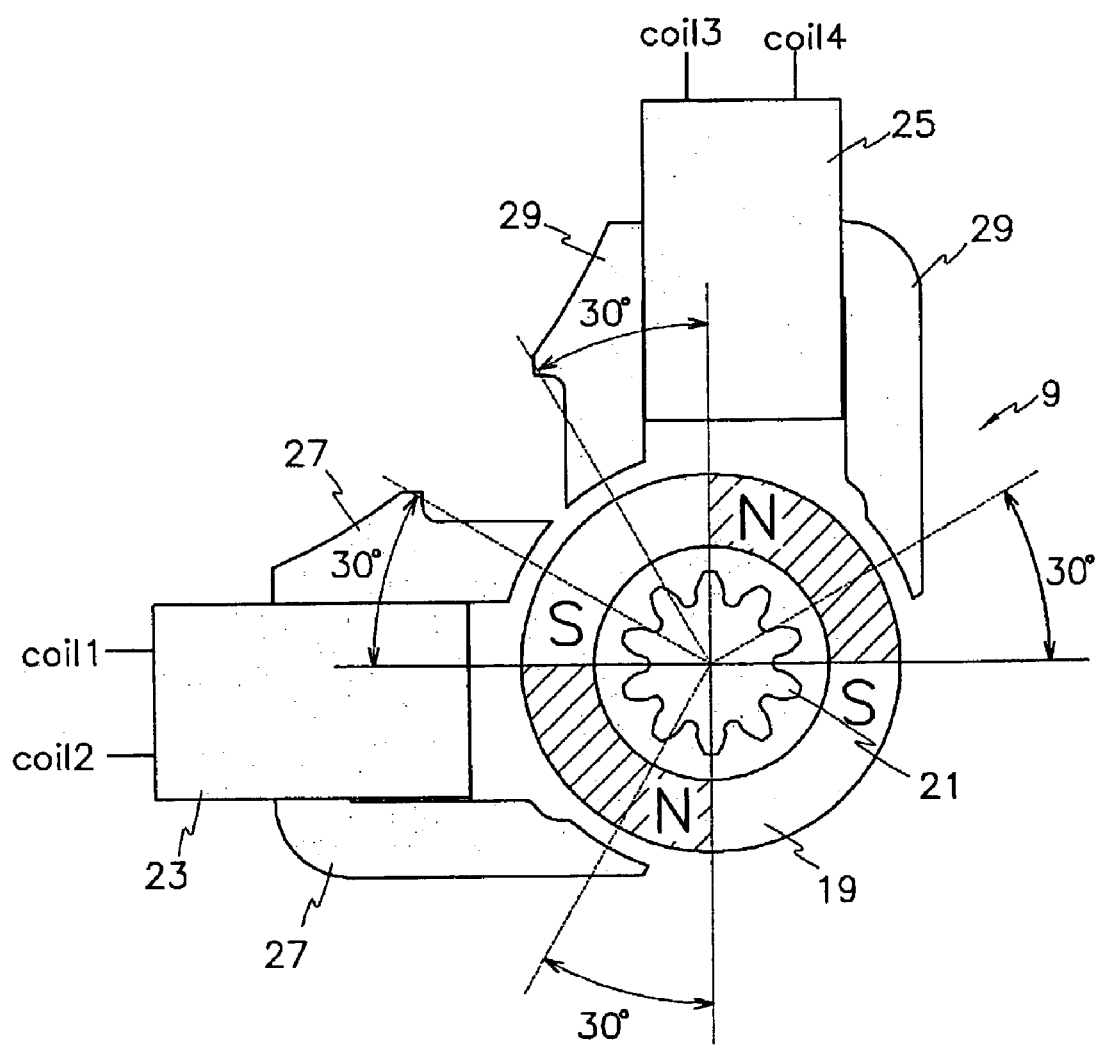
FIG. 4 is a detailed view illustrating a driving source depicted in FIG. 3.
Figure 5:
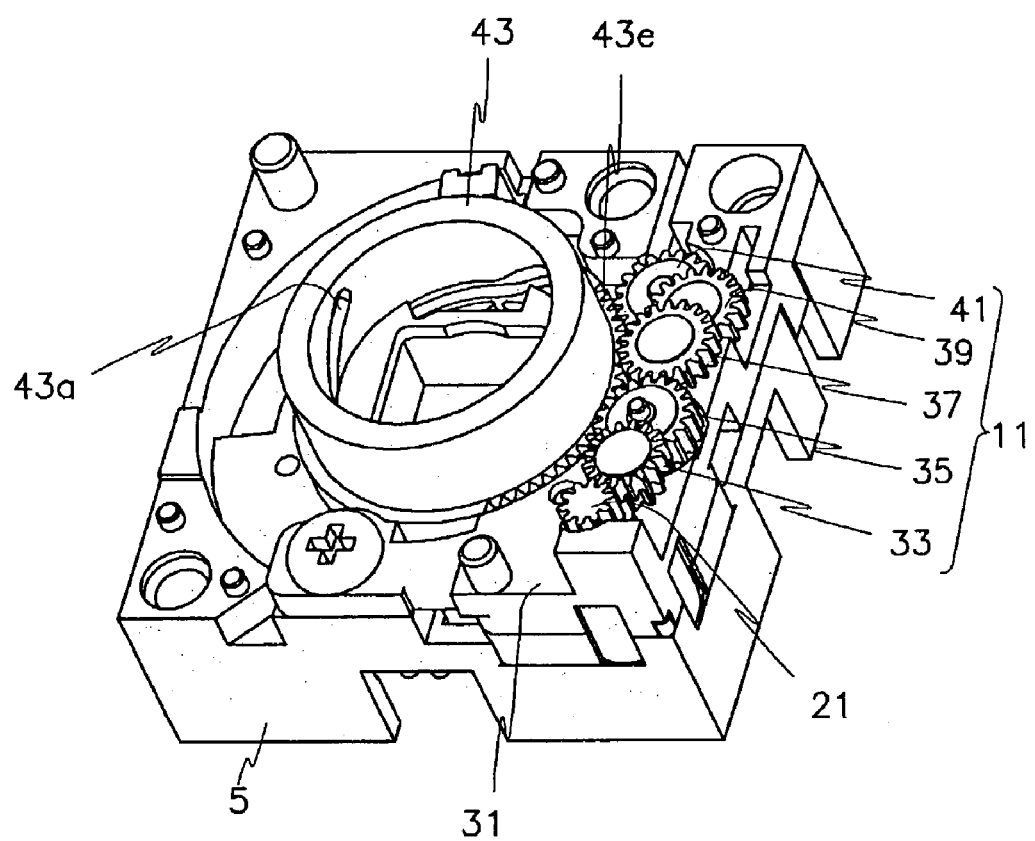
FIG. 5 is a perspective view of a reduction gear assembly according to a preferred embodiment of the present invention.
Figure 6:
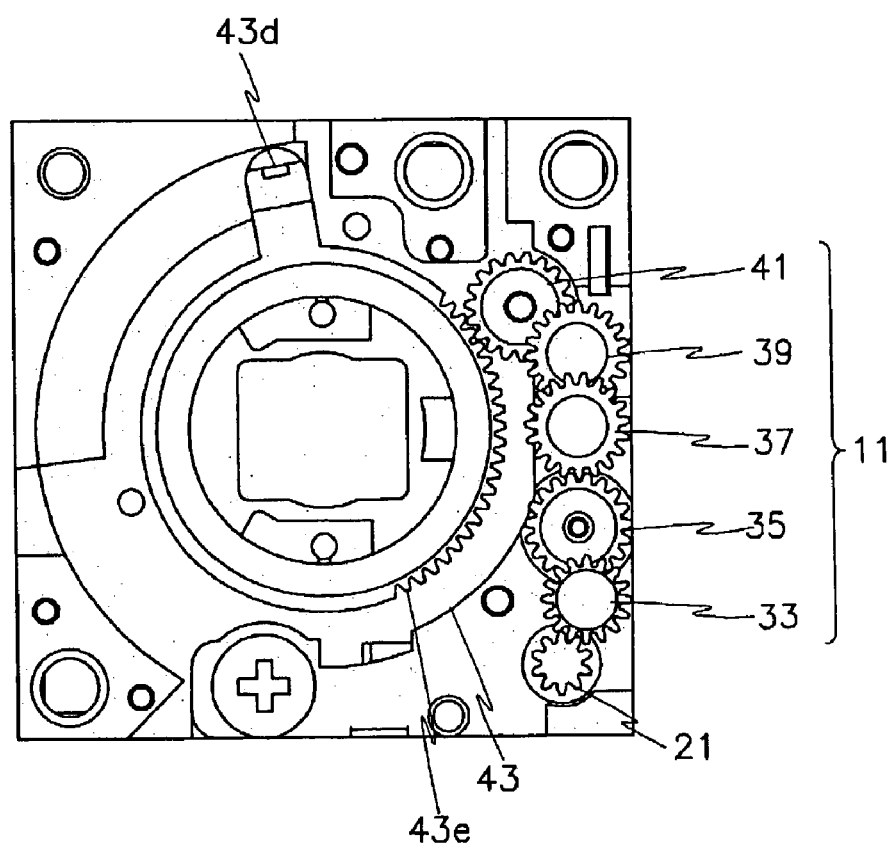
FIG. 6 is a plane view of FIG. 5.
Figure 7:
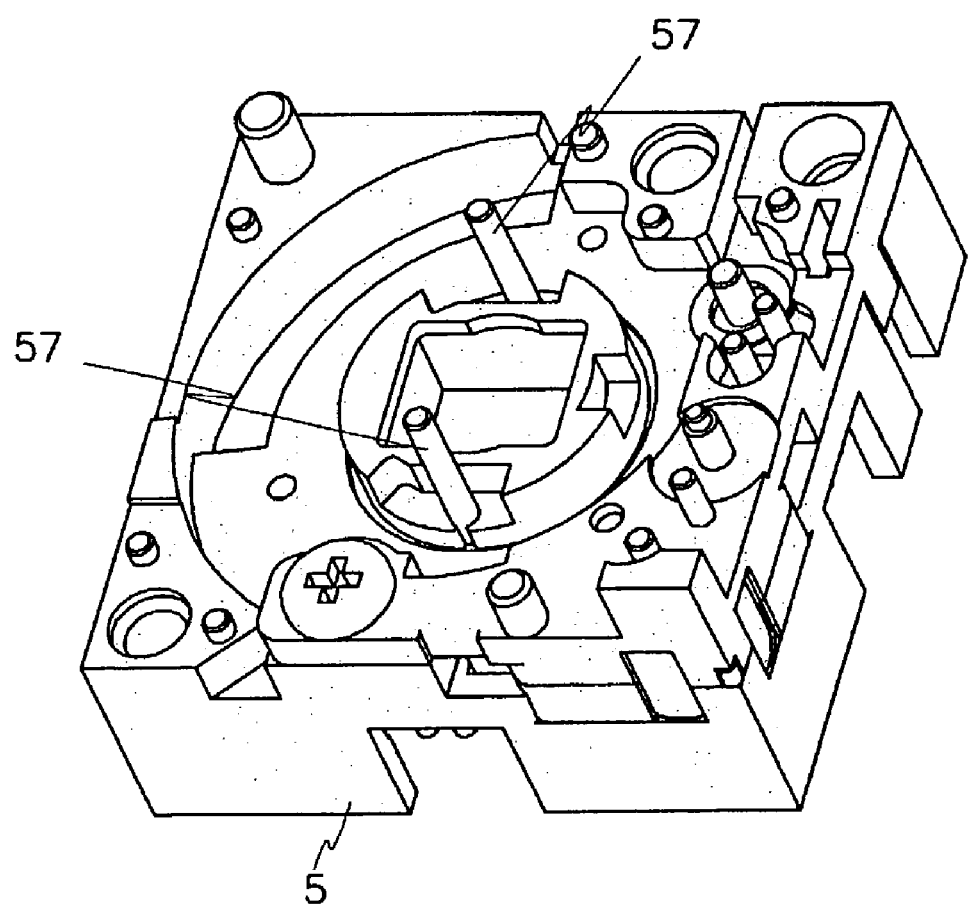
FIG. 7 is a perspective view of a step motor cover coupled to a zoom base according to a preferred embodiment of the present invention.

FIG. 2 shows a general outer appearance of the zoom lens system of the present invention, FIGS. 3 and 4 show a driving source of the zoom lens system, and FIGS. 5 and 6 show a power transmission gear assembly for transmitting driving power of the driving source.

Figure 10:
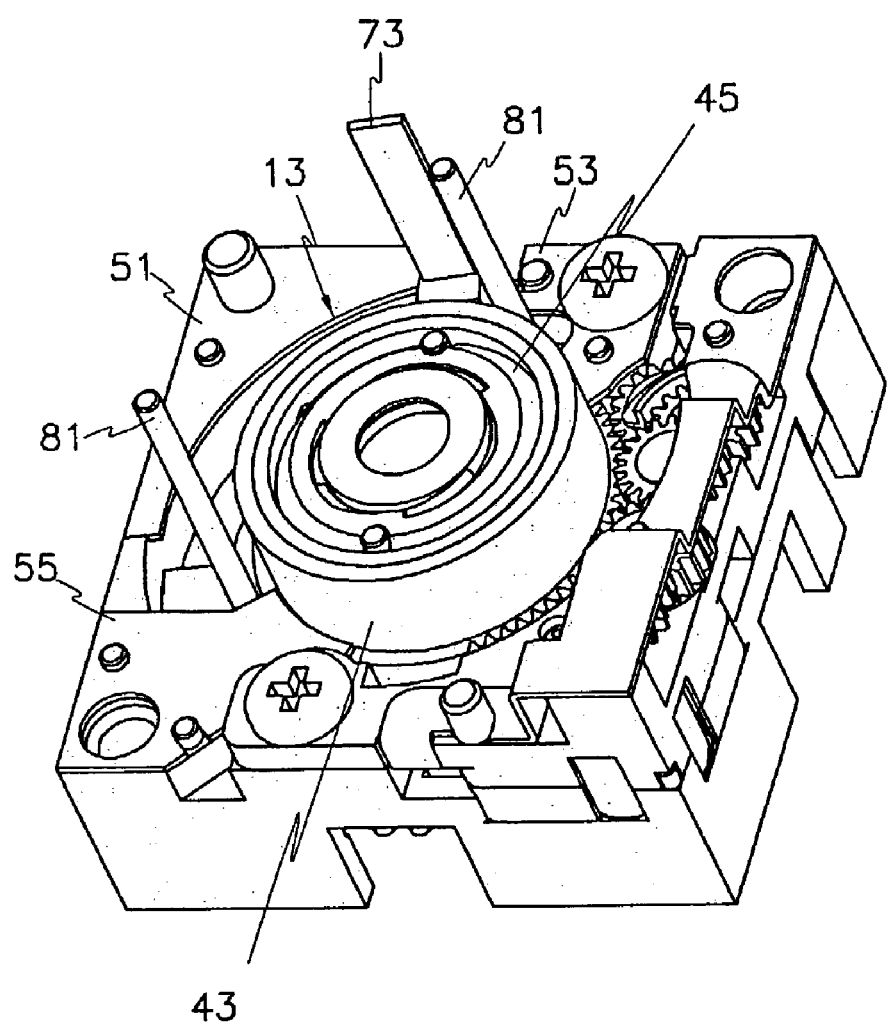
FIG. 10 is a perspective view of a second lens assembly according to a preferred embodiment of the present invention.

The zoom lens system comprises a zoom base 5, a CMOS module assembly that is an image pickup device, a driving source 9 (see FIGS. 3 and 4), plural power transmission gears 11 (see FIGS. 5 and 6), and first and second lens assemblies 13 and 15 (see FIGS. 2 and 10). The CMOS module assembly 7 and the driving source 9 are electrically connected to each other so that they can be controlled by a control unit (not shown). The control unit is preferably disposed in the portable electronic facility where the zoom lens system is employed.

The zoom base 5 functions as a base on which the CMOS module assembly 7, the driving source 9, the power transmission gear assembly 11, and the first and second lens assemblies 13 and 15 are coupled, to realize the zoom lens system.

The CMOS module assembly 7 is disposed on the zoom base 5 and is electrically connected to both the driving source 9 and a zoom switch (not shown) to control the driving source 9 through the zoom switch.

The CMOS module assembly 7 is coupled on a back side (a side opposite the subject) of the zoom base 5.

Figure 17:
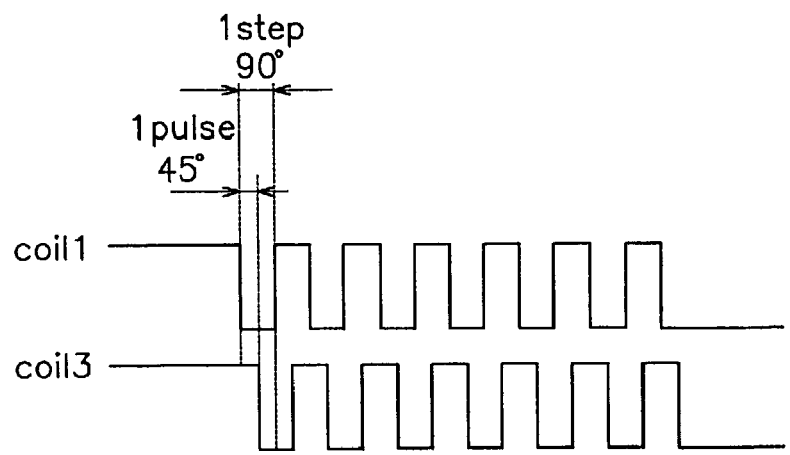
FIG. 17 is a timing diagram illustrating a control pulse generated by a driving source of the present invention.

The driving source 9 is a rotor including a cylindrical step motor magnet 19 provided with a rotational shaft 17. The step motor magnet 19 is rotatably coupled on a corner of a front side (a side toward the subject) of the zoom base 5 (see FIG. 3), and a step motor gear 21 (see FIG. 4) is fixedly coupled on the rotational shaft 17. The step motor gear 21 rotates in response to the rotation of the step motor magnet 19, and a stator composed of first and second step motor coils 23 and 25 and first and second step motor yokes 27 and 29 is disposed around the step motor magnet 19. The step motor coils 23 and 25 are disposed to be at right angles with respect to each other, and the step motor yokes 27 and 29 are also disposed at right angles to each other. The step motor coils 23 and 25 are directly coiled on the step motor yokes 27 and 29 to reduce the space limitation of a conventional bobbin. Furthermore, the right-angled dispositions of the step motor coils 23 and 25 and the step motor yokes 27 and 29 minimize the space limitation, thereby increasing freedom of design. The step motor yokes 27 and 29 are disposed around the step motor magnet 19 at magnetically opposite positions (N and S poles), whereby when the electric power is turned off, they are located on stable points having a regular interval of 90°. That is, as shown in FIG. 17, the driving source 9 rotates by 90° by two control pulses.

Such a driving source 9 designed as in the above makes it possible to manufacture the zoom lens system in a micro grade as it can effectively utilize the space of the zoom base 5 at which it is arranged.

The driving source 9 is covered by a cover 31 coupled on the zoom base 5, and the step motor gear 21 is disposed on a surface of the cover 31 facing the subject (see FIG. 5).

The power transmission gear assembly 11 is engaged with the step motor gear 21 to realize speed reduction. The power transmission gear assembly 11 includes first, second, third, fourth, and fifth gears 33, 35, 37, 39, and 41 that are engaged with the step motor gear 21 one after the other to receive driving force. The gears of the power transmission gear assembly are provided with a central hole to which the cover 31 is inserted.

Figure 8:
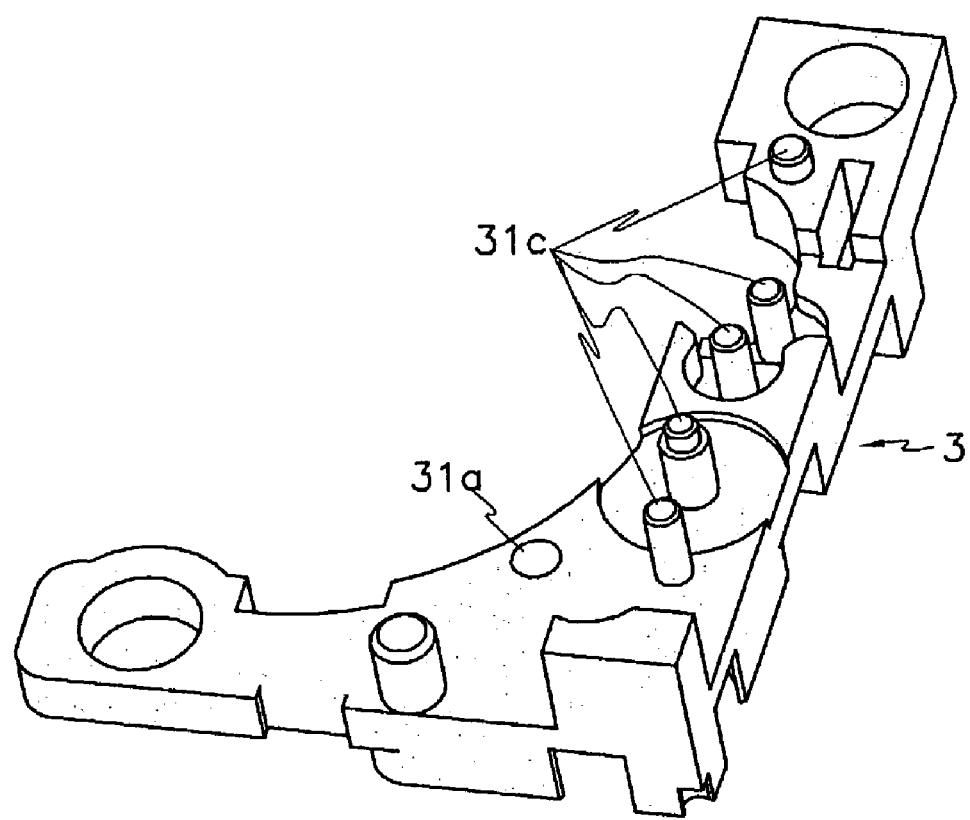
FIG. 8 is a perspective view illustrating a top portion of a step motor cover according to a preferred embodiment of the present invention.
Figure 9:
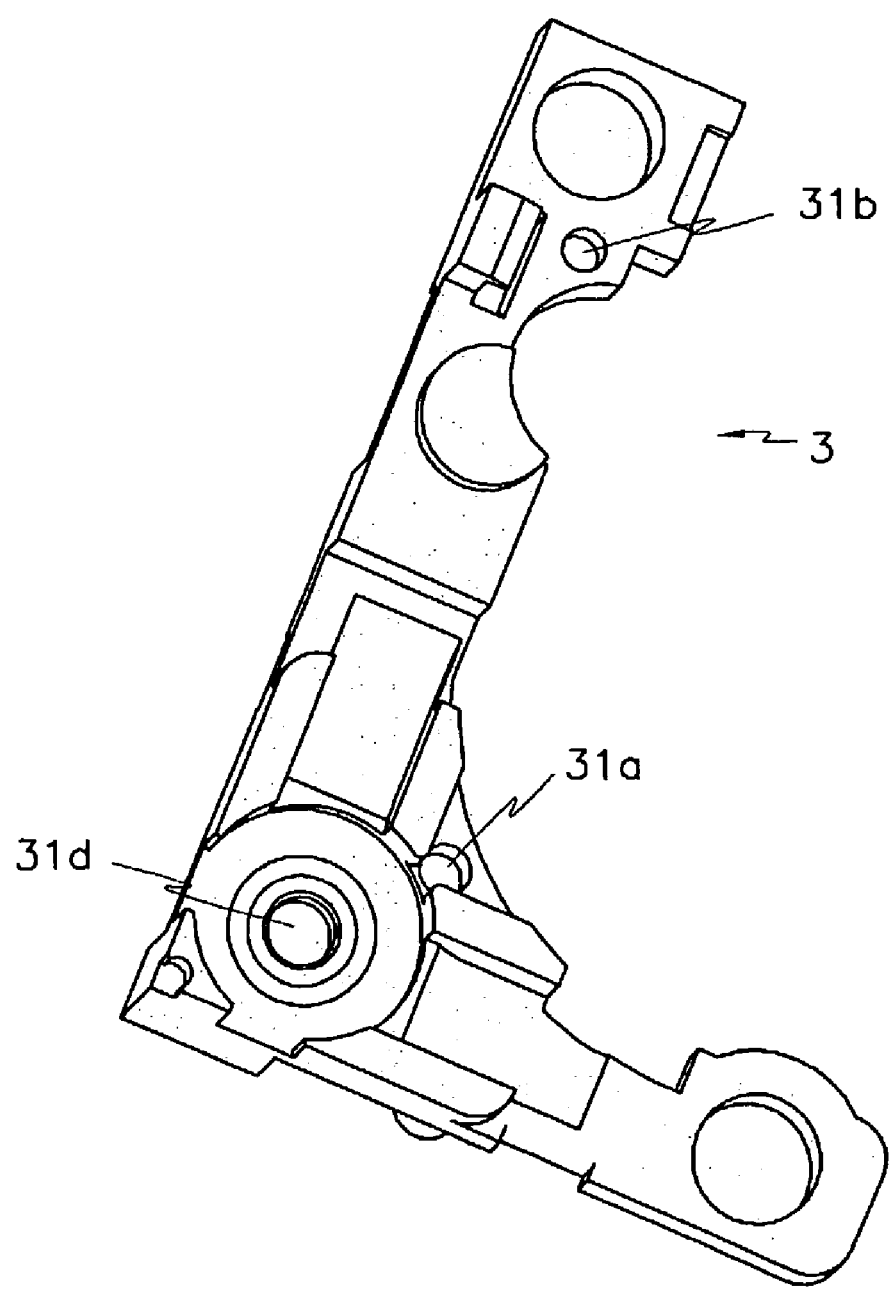
FIG. 9 is a perspective view illustrating a rear portion of a step motor cover according to a preferred embodiment of the present invention.

FIG. 8 shows a top portion, facing the subject, of the cover 31, and FIG. 9 shows a bottom portion, opposite to the portion facing the subject, of the cover 31.

The cover 31 is provided with holes 31a and 31b in which projections 5a and 5b formed on the zoom base 5 are fitted. The cover 31 is further provided at its top with shafts 31c inserted into the gears of the power transmission gear assembly 11. Therefore, the cover 31 is fixedly coupled on the zoom base 5. As shown in FIG. 9, the cover 31 is further provided with a hole 31d in which the rotational shaft 17 of the driving source 9 is inserted, on which the step motor gear 21 is coupled on a side facing the subject.

The number of gears of the power transmission gear assembly 11 is not limited to the above, but can be increased or reduced in accordance with the design.

The first lens assembly 13 comprises, as shown in FIG. 10, a first lens cam 43, a first lens barrel 45, a first lens holder 47, and a first lens 48.

The first lens cam 43 is formed in a cylindrical shape, and is provided at its outer circumference with gear teeth 43e engaged with the gear 41 (see FIGS. 5 and 6). The first lens cam 43 is rotatably coupled on the zoom base 5 by driving force of the gear 41, and it is provided at its inner circumference with a cam groove 43a.

The location of the first lens cam 43 can be determined by plural lens cam covers 51, 53, and 55 coupled on the zoom base 5 (see FIG. 10).

The first lens cam 43 is further provided at its outer circumference with an extended portion 43d and with a hole, in a direction of an optical axis, in which a lens cam shaft 73 is coupled in the direction of the optical axis to transmit rotational force to an inner second lens cam 75, which will be described below.

The first lens barrel 45 is disposed on the inner circumference of the first lens cam 43 and formed in a cylindrical shape. The first lens barrel 45 is provided at its outer circumference with a cam projection 45a inserted into the cam groove 43a of the first lens cam 43.

In addition, the first lens barrel 45 is fitted into plural first lens shafts 57 projected on a side facing the subject of the zoom base 5 in the direction of the optical axis, thereby allowing reciprocation along the optical axis. That is, the first lens barrel 45 is provided with holes (not shown) in which the first lens shafts 57 are slidably inserted, thereby allowing linear movement along the optical axis in accordance with the rotation of the first lens cam 43.

The first lens barrel 45 is provided at its inner circumference with threads to which the first lens holder 47 with the first lens 41 is screw-coupled. That is, the first lens holder 47 is provided at its outer circumference with threads coupled to the female threads of the first lens barrel 45. The screw coupling of the first lens barrel 45 and the first lens holder 47 is for pint adjustment before the assembly of the camera is finalized, by manipulating the lens barrel 45 and the lens holder 47, after which the barrel 45 and the holder 47 are fixed by a bonding process. Therefore, as the first lens barrel 45 moves in the direction of the optical axis, the first lens can move along the movement of the first lens barrel 45 in the direction of the optical axis.

The second lens assembly 15 comprises an outer second lens cam 71, an inner second lens cam 75 disposed on an inner circumference of the outer second lens cam 71, and a second lens barrel 79 in which a second lens 77 are coupled.

Figure 15:
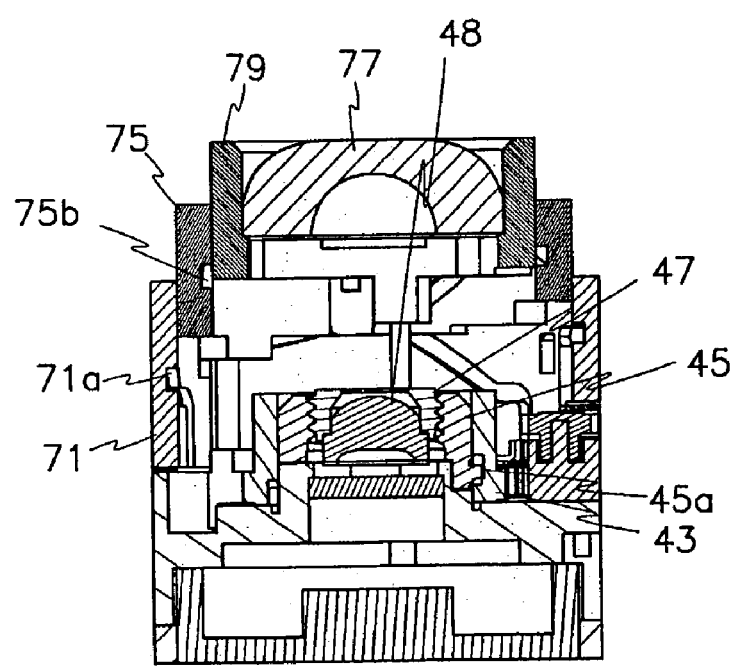
FIG. 15 is a longitudinal sectional view of FIG. 2 illustrating a wide state.

The outer second lens cam 71 is formed in a cylindrical shape and is fixedly coupled to the zoom base 5 by a screw, and it is provided at its inner circumference with spiral cam grooves 71a spaced at 120° intervals (see FIG. 15).

Figure 12:
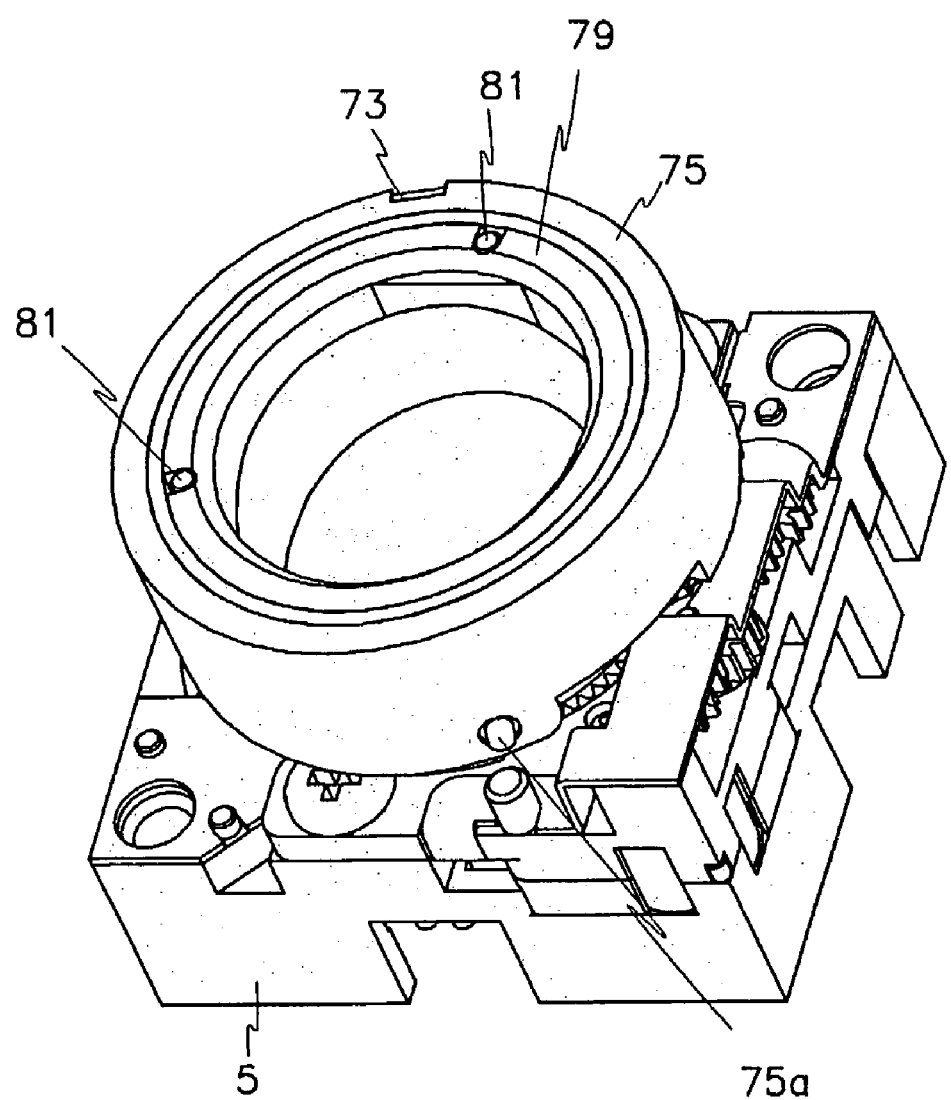
FIG. 12 is a perspective view of a lens cam of a first lens assembly according to a preferred embodiment of the present invention.
Figure 13:
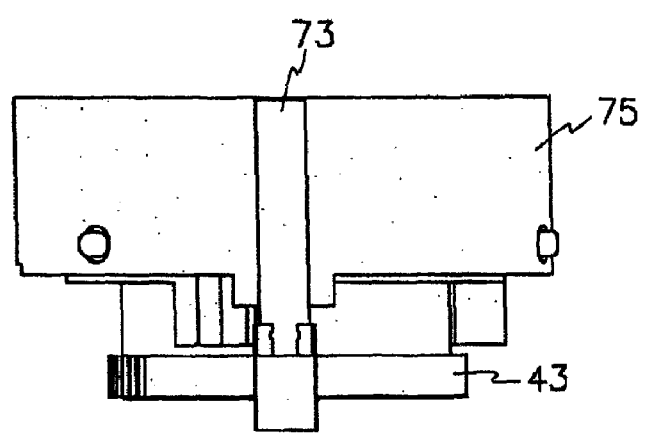
FIG. 13 is a side view of FIG. 12.

The inner second lens cam 75 is provided at its outer circumference with cam projections 75a at 120° intervals, the cam projections 75a being coupled in the cam grooves 71a of the outer second lens cam 71 so that the inner second lens cam 75 can move along the cam grooves 71a (see FIG. 12).

The inner second lens cam 75 is coupled to the cam shaft 73 in the direction of the optical axis. As a result, the inner second lens cam 75 rotates in accordance with the rotation of the first lens cam 43 and moves in the direction of the optical axis. The inner second lens cam 75 is provided at its inner circumference with three spiral cam grooves 75b spaced at 120° intervals.

Figure 11:
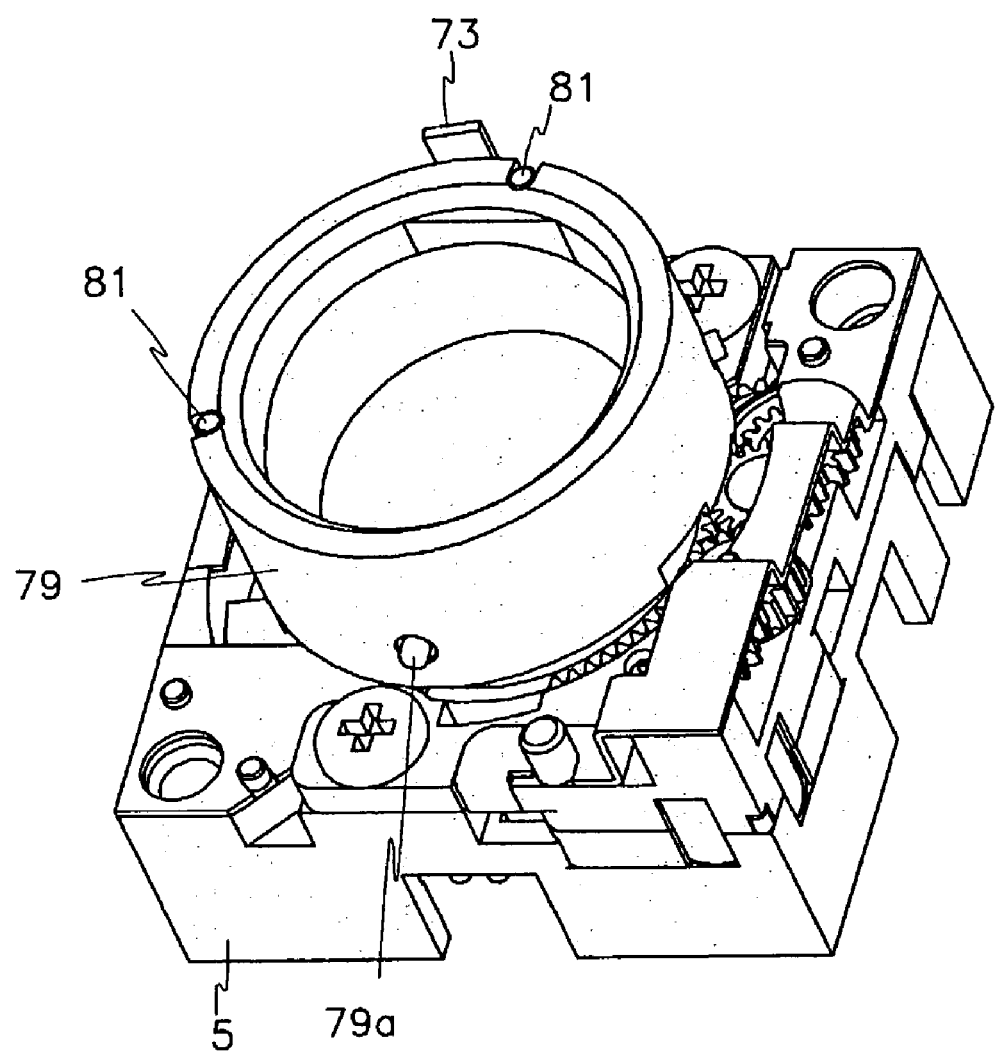
FIG. 11 is a perspective view of a first lens assembly according to a preferred embodiment of the present invention.

The second lens barrel 79 is provided at its outer circumference with cam projections 79a spaced at 120° intervals (see FIG. 11). The cam projections 79a are coupled to the cam grooves 75b of the second lens cam 75 so that the second lens barrel 79 can move along the cam grooves 75b. The second lens barrel 79 is coupled to the second lens shaft 81 that is coupled on the zoom base 5 in the direction of the optical axis such that it can slidably move in the direction of the optical axis. Therefore, the second lens barrel 79 is designed such that it linearly moves in the direction of the optical axis in accordance with the rotation of the inner second lens cam 75. The second lens 77 is designed to tightly fit in the second lens barrel 79.

The operation of the above-described zoom lens system will be described hereinafter.

Figure 14:
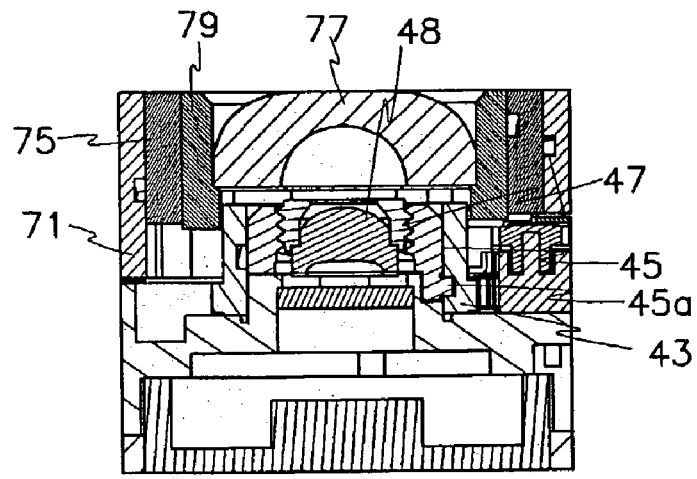
FIG. 14 is a longitudinal sectional view of FIG. 2 illustrating a close state.
Figure 16:
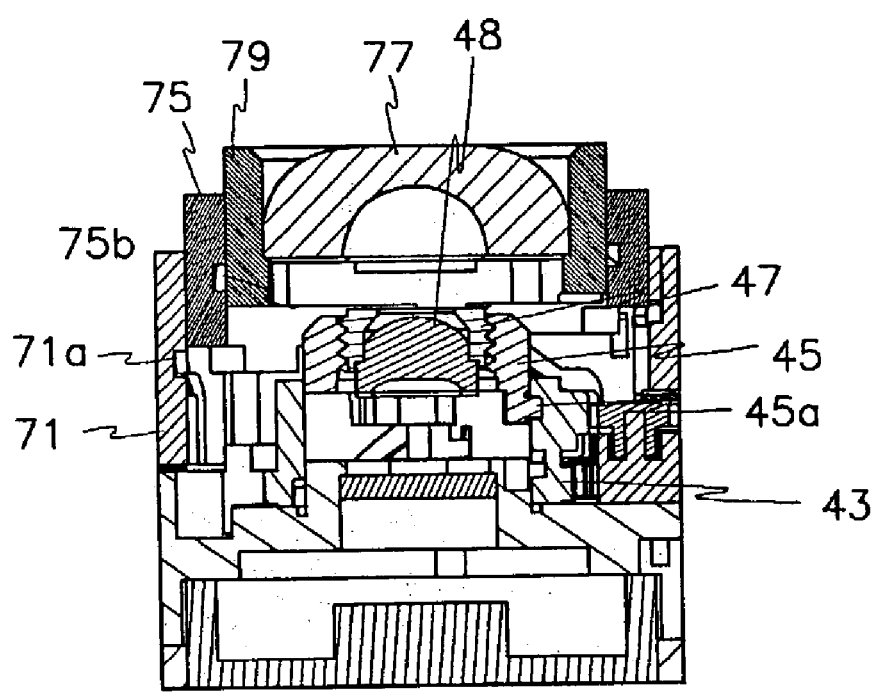
FIG. 16 is a longitudinal section view illustrating a telephoto state of FIG. 2.

FIG. 14 shows a close state, FIG. 15 shows a wide state, and FIG. 16 shows a telephoto state.

Figure 18:
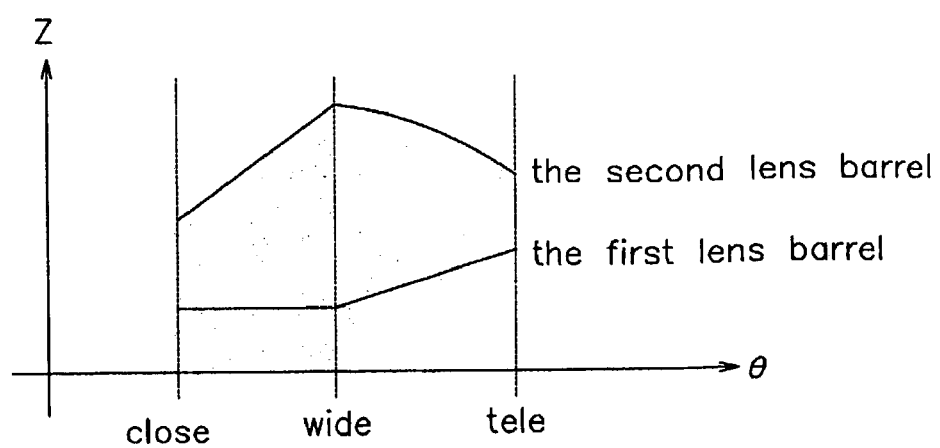
FIG. 18 is a graph illustrating a zooming trace of the present invention.

When a pulse signal for driving the step motor magnet 19 is applied to the coils 1 to 4 by the control unit (not shown), the step motor magnet 19 rotates by 45°, and as shown in FIG. 17, when two pulses are applied to the coils, the step motor magnet 19 rotates by 90°. When the step motor magnet 19 rotates by this control, the first and second lens assemblies 13 and 15 are moved to realize the zooming operation. That is, the rotational force of the step motor magnet 19 is transmitted to the power transmission gear assembly 11 to rotate the first lens cam 43 counterclockwise. At this point, the cam projections 45a of the first lens barrel 43 move along the cam grooves 43a provided on the inner circumference of the first lens cam 43. As a result, the first lens barrel 43 moves in the direction of the optical axis by the first lens shaft 57. However, when the lens system moves from the close state to the wide state in accordance with the shape of the cam grooves 43a formed on the inner circumference of the first lens cam 43, as shown in FIG. 18, there is no movement toward the subject. The movement is realized only when it moved from the wide state to the telephoto state.

In addition, the rotational force of the first lens cam 43 is transmitted to the lens cam shaft 73 to rotate the inner second lens cam 75 counterclockwise. As the inner second lens cam 75 rotates, the second lens barrel 79 moves along the cam grooves 75b formed on the inner circumference of the inner second lens cam 75. At this point, since the second lens barrel 79 is coupled to the second lens shaft 81, it moves linearly in the direction of the optical axis. In addition, since the projections 75a of the inner second lens cam 75 are coupled to the cam grooves 71a of the outer second lens cam 71 such that they can move along the cam grooves 71a, the inner second lens cam 75 linearly moves in the direction of the optical axis while rotating. As a result, the second lens assembly 15 moves from the close state to the wide state toward the subject by the amount of the movements by the inner second lens cam 75 and the second lens barrel. Therefore, the zoom trace of the second lens assembly 15 is formed toward the subject when it moves from the close state to the wide state, and it is formed away from the subject when it moves from the wide state to the telephoto state.

The above-described structure of the zoom lens system is very effective in reducing the size of the system.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A zoom lens system comprising:
   a zoom base designed to be coupled to an electronic facility;
   a driving source for generating rotational force in accordance with a control signal of the electronic facility;
   plural power transmission gears disposed on the zoom base to reduce the rotational force of the driving source;
   a first lens cam disposed on the zoom base and rotated by the rotational force of the power transmission gears;
   plural first lens shafts coupled on the zoom base in a direction of an optical axis and located in the first lens cam;
   a first lens barrel having a first lens, the first lens barrel being disposed in the first lens cam and slidably coupled to the first lens shafts in the direction of the optical axis to move in the direction of the optical axis in accordance with rotation of the first lens cam;
   a power transmission member coupled to the first lens cam, the power transmission member extending in the direction of the optical axis and rotating by rotation of the first lens cam;
   an outer second lens cam disposed on an outer circumference of the first lens cam and fixed on the zoom base;
   an inner second lens cam disposed in the outer second lens cam and coupled to the power transmission member, the inner second lens cam rotating by rotation of the power transmission member, the inner second lens cam in cam engagement with the outer second lens cam and moveable in the direction of the optical axis while rotating;
   plural second lens shafts coupled to the zoom base in the direction of the optical axis and located in the inner second lens cam; and
   a second lens barrel having a second lens, the second lens barrel being disposed in the inner second lens cam and slidably coupled to the second lens shafts to linearly move in the direction of the optical axis in accordance with rotation of the inner second lens cam.

2. A zoom lens system of claim 1, wherein the driving source comprises:
   a rotor formed of a step motor magnet; and
   a stator having a pair of step motor coils and a pair of step motor yokes, the step motor coils being disposed on an outer circumference of the step motor magnet and being spaced away from each other at right angles, and the step motor yokes being disposed on an outer circumference of the step motor magnet and spaced away from each other at right angles.

3. A zoom lens system of claim 1, wherein the first lens cam is provided at its inner circumference with plural cam grooves, and the first lens barrel is provided at its outer circumference with plural cam projections slidably coupled to the cam grooves.

4. A zoom lens system of claim 1, wherein the outer second lens cam is provided at its inner circumference with plural cam grooves, and the inner second lens cam is provided at its outer circumference with plural cam projections slidably coupled to the cam grooves.

5. A zoom lens system of claim 1, wherein the inner second lens cam is provided at its inner circumference with plural cam grooves, and the second lens barrel is provided at its outer circumference with plural cam projections slidably coupled to the cam grooves.

6. A zoom lens system of claim 1, wherein the power transmission member comprises a lens cam shaft extending from the first lens cam in a direction of an optical axis, the lens cam shaft coupled to the inner second lens cam for transmitting rotational force.

7. A zoom lens system for an electronic device comprising:
   a zoom base coupled with a driving source for generating rotational force and plural power transmission gears for reducing the rotational force of the driving source;
   a first lens cam disposed on the zoom base and rotating by the rotational force of the power transmission gears;
   plural first lens shafts coupled to the zoom base and extending in a direction of an optical axis;
   a first lens barrel having a first lens, the first lens barrel disposed in the first lens cam and coupled with the first lens shafts, the first lens barrel moveable in the direction of the optical axis in accordance with rotation of the first lens cam;
   a power transmission member coupled with the first lens cam and rotating by rotation of the first lens cam;
   an outer second lens cam disposed on an outer circumference of the first lens cam and fixedly coupled to the zoom base;
   an inner second lens cam disposed in the outer second lens cam, the inner second lens cam coupled to the power transmission member and rotating by rotation of the power transmission member, the inner second lens cam in cam engagement with the outer second lens cam and moveable in the direction of the optical axis while rotating;
   plural second lens shafts coupled to the zoom base and extending in the direction of the optical axis; and
   a second lens barrel having a second lens, the second lens barrel disposed in the inner second lens cam and slidably coupled to the second lens shaft to linearly move in the direction of the optical axis in accordance with rotation of the inner second lens cam.

8. A zoom lens system of claim 7, wherein the plural first and second lens shafts are affixed on an upper surface of the zoom base.

9. A zoom lens system of claim 7, wherein the power transmission member comprises a lens cam shaft extending from the first lens cam in a direction of an optical axis for said coupling to the inner second lens cam.

10. A zoom lens system of claim 9, wherein the outer second lens cam is provided at its inner circumference with plural cam grooves, and the inner second lens cam is provided at its outer circumference with plural cam projections slidably coupled to the cam grooves of the outer second lens cam for said cam engagement.

11. A zoom lens system of claim 7, wherein the zoom base has a thin shape with its height in the direction of the optical axis smaller than its lateral size in a direction perpendicular to the optical axis.

12. A zoom lens system of claim 11, wherein the zoom base includes a circular groove recessed from an upper surface of the zoom base and at least a lower portion of the first lens cam is received in the circular groove.

13. A zoom lens system of claim 11, wherein the power transmission gears are arranged on an upper surface of the zoom base at locations outside of the first lens cam.

* * * * *